United States Patent Office 2,723,967
Patented Nov. 15, 1955

2,723,967

COPOLYMERS OF AN UNSATURATED POLYESTER AND ACRYLONITRILE

Walter M. Thomas, Springdale, Conn., assignor to American Cyanamid Company, New York, N. Y., a corporation of Maine No Drawing. Application April 23, 1951,
Serial No. 222,532

1 Claim. (Cl. 260—78.5)

This invention relates to the production of new materials having valuable and characteristic properties that make them especially suitable for use in industry, for example in molding, casting, coating, electrically insulating and adhesive applications, and for other purposes. More particularly the invention is concerned with copolymers of interpolymers produced from polyesters (diesters, triesters, etc.) of an ethylenically unsaturated polycarboxylic acid with an amino alcohol in which the amino nitrogen is tertiary, including, for instance, a diester of an alpha,beta-ethylenically unsaturated dicarboxylic acid (or ethylenically unsaturated alpha,beta-dicarboxylic acid) with such an amino alcohol, e. g., bis(2-diethylaminoethyl)fumarate and other fumaric, maleic, mesaconic and citraconic diesters of a monoamino monohydric primary alcohol in which the amino nitrogen is tertiary, as well as the corresponding itaconic polyesters. The invention claimed herein is directed specifically to a composition comprising a copolymer of copolymerizable ingredients including, by weight, (1) acrylonitrile and (2) bis(2-diethylaminoethyl)fumarate, the compound of (2) constituting from about 1% to about 2% of the total amount of (1) and (2).

I have discovered that polyesters of an ethylenically unsaturated polycarboxylic acid with an amino alcohol in which the amino nitrogen is tertiary, e. g., a diester of an alpha, beta-ethylenically unsaturated dicarboxylic acid with a dialkylamino monohydric primary alcohol, can be polymerized with acrylonitrile to yield new and valuable synthetic compositions which are especially suitable for use in the plastics, coating, fiber-forming and other arts. Mixtures of different unsaturated polyesters of the kind with which the present invention is concerned also can be copolymerized with acrylonitrile to yield valuable and useful products.

Also within the scope of the present invention are polymerizable compositions comprising (1) a polyester of an ethylenically unsaturated polycarboxylic acid (e. g., maleic, fumaric, itaconic, mesaconic, citraconic, aconitic, etc., acids, singly or admixed) with an amino alcohol in which the amino nitrogen is tertiary (or a mixture of such alcohols) and (2) acrylonitrile; as well as products comprising the polymerized composition.

The esters used in practicing this invention have, in general, a fairly high degree of basicity (as do also the homopolymers thereof), and hence have particular value and utility when incorporated into non-basic or less basic substances (e. g., polyacrylonitrile), having little or no dye receptivity (especially toward acid dyes) in order to improve the dyeability or dye receptivity of such substances. The modification can be effected either by forming a copolymer of the polyester and acrylonitrile or by incorporating a small amount (e. g., from 1% to 5 or 10%, by weight of the whole) of the homopolymeric polyester with the polymeric acrylonitrile by any suitable means, e. g., while the latter is dissolved or dispersed in a suitable liquid medium, for instance, a concentrated aqueous solution of a water-soluble thiocyanate (e. g., sodium thiocyanate) or other water-soluble salt which yields highly hydrated ions in an aqueous solution, numerous examples of which are given in Rein Patent No. 2,140,921.

An object of the invention is to prepare a new class of polymerization products (copolymers or interpolymers) for use in industry.

Another object of the invention is to improve the usefulness of the aforementioned unsaturated polyesters whereby the field of utility of these esters is enhanced.

Another object of the invention is to prepare copolymers which can be spun or otherwise shaped to form filaments, tapes, ribbons, tubes, rods, sheets, etc., and the shaped articles then dyed either before or after having been oriented or treated to improve their useful properties.

Other objects of the invention will be apparent to those skilled in the art from the description and examples which follow.

Various methods may be used in preparing the monomeric unsaturated polyesters employed in practicing the present invention. One suitable method comprises effecting reaction between (1) an amino alcohol in which the amino nitrogen is tertiary and (2) a polyester of (a) an ethylenically unsaturated polycarboxylic acid, more particularly a polyester of an ethylenically unsaturated alpha,beta-polycarboxylic acid or a polyester of an alpha,-beta-ethylenically unsaturated polycarboxylic acid, and (b) an alcohol that is more volatile than the amino alcohol employed. The amount of amino alcohol is usually in excess of stoichiometric proportions. This method of preparation involves a transesterification reaction, and can be carried out with the aid of a suitable calatlyst, e. g., metallic sodium or other alkali metal, an alcoholate of an alkali metal, potassium carbonate, aluminum isopropoxide, etc., and in the presence of a suitable inhibitor of polymerization, e. g., a phenolic body (for instance, hydroquinone, etc.), an aromatic amine, e. g., p-phenylene diamine, etc. The reaction mixture is heated in a reaction vessel provided with a fractionating column until the theoretical quantity of liberated alcohol has been collected as a distillate. The unsaturated ester is usually isolated by vacuum distillation of the residue. If desired, the reaction often can be carried out advantageously in the presence of a liquid medium which is inert to both the reactants and the reaction product under the conditions of reaction, e. g., benzene, toluene, dioxane, etc. Such an inert medium may be one which is a solvent for one or both of the reactants, as well as for the reaction product. An alternative method of preparation involves reaction between an acid halide of an ethylenically unsaturated polycarboxylic acid with an alkali-metal alcoholate of an amine in which the amino nitrogen is tertiary, the reaction being effected in the presence of an inert liquid medium of the kind just mentioned.

The following examples are illustrated of how the esters used in practicing this invention can be prepared. All parts are by weight.

*Example 1*

| | Parts |
|---|---|
| Dimethyl fumarate (approx.) | 265 |
| 2-diethylaminoethanol (β-diethylaminoethanol) | 900 |
| p-Phenylene diamine(polymerization inhiibtor) | 20 |
| Metallic sodium, chips (transesterification catalyst) | 5 |

The dimethyl fumarate was prepared by rapidly stirring 400 parts of dimethyl maleate with 4.3 parts of piperidine while cooling the mass. Isomerization to dimethyl fumarate occurred rapidly, the product crystallizing with the evolution of much heat. The crude dimethyl fumarate was washed thoroughly with methanol and sucked dry on a filter. The dried product, which represented a yield of about 265 parts, was charged to a reaction vessel to which was then added the other ingredients. The reaction vessel was provided with a stirrer and a short column. The mixture was heated in this vessel, with stirring, to remove the methanol by-product of the reaction. When no more methanol was distilling off, the vessel was connected to a downward condenser and the unreacted amino alcohol was removed under vacuum. Bis(2-diethylaminoethyl) fumarate was collected as the fraction boiling at 167°–190° C. at a pressure of about 3–5 mm., most of the cut boiling at 185°–190° C. under 4 mm. pressure; neutralization equivalent 184 (189 is the calculated neutralization equivalent for $C_{18}H_{30}N_2O_4$, mole weight 378); $n_D^{25°}$, 1.4550; yield, about 351 parts.

*Example 2*

|  | Parts | Approx. Molar Ratio |
|---|---|---|
| Dimethyl fumarate | 144 | 1 |
| 2-Diethylaminoethanol | 468 | 4 |
| Phenyl-beta-naphthylamine (polymerization inhibitor) | 5 |  |
| Aluminum isopropoxide (transesterification catalyst) | 2 |  |

The aforementioned ingredients were added to a reaction vessel fitted with a short column and variable reflux head, the vessel being heated in an oil bath. With the bath at 160°–172° C. approximately 48 parts by weight of distillate was collected at 66°–73° C. The residue was distilled under vacuum. The high-boiling fraction (208 parts) was re-distilled under vacuum. Bis-(2-diethylaminoethyl)fumarate was collected as the fraction that boiled, for the most part, at 173° C. at 2–3 mm. pressure. It was an amber-colored liquid which was not lightened by two subsequent distillations, one from zinc dust, nor by treatment with a decolorizing carbon. The final yield amounted to 110 parts.

In a manner similar to that described above with particular reference to the preparation of bis(2-diethylaminoethyl) fumarate, other amino alcohol polyesters of other ethylenically unsaturated polycarboxylic acids, e. g., maleic, fumaric, citraconic, mesaconic, itaconic and aconitic acids, can be prepared from the corresponding poly-(lower alkyl) esters of these acids. Illustrative examples of amino alcohols that can be used in preparing my new polyesters are:

Epsilon-diethylaminopentanol
Epsilon-dipropylaminopentanol
Bis(dimethylaminomethyl)carbinol
2-hydroxy-4-methylmorpholine
1-(beta-hydroxyethyl)piperazine
Beta-diisopropylaminoethanol
Beta-di-n-propylaminoethanol
Beta-diphenylaminoethanol
Beta-didodecylaminoethanol
Gamma-diethylaminopropanol
Gamma-diamylaminopropanol
Delta-diethylaminobutanol
Delta-dipropylaminobutanol
Delta-didecylaminobutanol
Delta-dibutylaminobutanol
Delta-dixenylaminobutanol
Delta-diallylaminobutanol
Delta-diisobutylaminobutanol
Diesters and diethers of triethanolamine, e. g., the dimethyl ether of triethanolamine, triethanolamine diacetate, etc.
Beta-diisobutylaminoethanol
Beta-hydroxy-beta-dimethylaminodiethyl ether
Triethanolamine
Tripropanolamine
Tributanolamine
Dimethylglucamine
Triisobutanolamine
N-octyl-N-methylglucamine
Beta-(N-methyl-N-cyclohexylamino)ethanol
2-(diphenylamino)cyclohexanol
2-(di-o-tolylamino)cyclohexanol
Beta-(N-methyl-N-cyclohexylamino)ethanol
1-(beta-hydroxyethyl)decahydroquinoline
1-(beta-hydroxyethyl)monoalkylpiperazines
The N-vinyl-N-alkylaminoethanols
4-(beta-hydroxyethyl)morpholine
4-(beta-hydroxyethyl)thiomorpholine, etc.

The amino alcohols used in producing the polyesters employed in practicing the present invention are those in which the amino nitrogen is tertiary. To the best of my knowledge and belief, the amino alcohol can be of any nature whatsoever so long as it contains an alcohol group and has tertiary amino nitrogen only. The amino alcohol can be one which contains one or more (e. g., two, three, etc.) amino groups or one or more (e. g., two, three, etc.) alcohol groups, but I prefer to use a monoamino monohydric alcohol, especially since such alcohols are more readily available and are more generally satisfactory. The alcohol group can be primary, secondary or tertiary, the primary alcohols being the preferred choice and then the secondary. The amino alcohol as a whole can be aliphatic, aromatic, alicyclic or heterocyclic; saturated or unsaturated; and monofunctional or polyfunctional with respect to either the amino group or the alcohol group. The radicals attached to the nitrogen can be of many types, e. g., alkyl, aralkyl, alkaryl, alkoxyalkyl, aryl, cycloalkyl, etc., and they may be the same or different. In the amino alcohols used in producing the aforementioned esters, two of the valences of the amino nitrogen can be satisfied by a closed chain of atoms (the ring atoms being all carbon or comprising other heteroatoms) and the third valence by some monovalent radical, or all three valences can be satisfied by monovalent radicals.

Any suitable means may be used in effecting polymerization of the unsaturated polyester alone to form a homopolymer of the unsaturated polyester, which then can be blended with a polymer of acrylonitrile as has been stated hereinbefore, or in effecting polymerization of the unsaturated polyester admixed with acrylonitrile to form a copolymer thereof. As has been mentioned hereinbefore heat or light or both, with or without a polymerization catalyst, can be used. Ultraviolet light is more effective than ordinary light. Preferably a polymerization catalyst is employed. Any of the polymerization catalysts which are suitable for use in polymerizing compounds containing an ethylenically unsaturated grouping, specifically a vinyl grouping, can be employed. Among such catalysts are the inorganic peroxides, e. g., hydrogen peroxide, barium peroxide, magnesium peroxide, etc., and the various organic peroxy catalysts, illustrative examples of which latter are the dialkyl peroxides, e. g., diethyl peroxide, dipropyl peroxide, dilauryl peroxide, dioleyl peroxide, distearyl peroxide, di-(tert.-butyl) peroxide and di-(tert.-amyl) peroxide, such peroxides often being designated as ethyl, propyl, lauryl, oleyl, stearyl, tert.-butyl and tert.-amyl peroxides; the alkyl hydrogen peroxides e. g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e. g., coconut oil acid peroxides, etc.; unsymmetrical or mixed diacyl peroxides, e. g., acetyl benzoyl peroxide, propionyl benzoyl peroxide, etc.; terpene oxides, e. g., ascaridole, etc.; and salts of inorganic per-acids, e. g., ammonium persulfate, sodium persulfate, potassium persulfate, sodium percarbonate, potassium percarbonate, sodium perborate, potassium perborate, sodium perphosphate, potassium perphosphate, etc. Other examples of organic peroxide and of other catalysts that can be employed are given in Drechsel and Padbury copending application Serial No. 121,066 filed October 12, 1949, now Patent No. 2,550,652, dated April 24, 1951.

The concentration of the catalyst employed is usually small, that is, for the preferred catalysts from, by weight, about 0.5 or 1 part of catalyst per thousand parts of the polymerizable composition to be polymerized to about 3 or 4 or more parts of catalyst per 100 parts of the monomer or mixture of comonomers. If an inhibitor of the kind hereinafter mentioned be present, larger amounts of catalyst may be necessary according to the concentration of the inhibitor.

If desired, the mixed monomers can be polymerized in emulsion or in solution state to yield the copolymer. In the latter case, various inert organic solvents may be employed, depending upon the particular comonomer used, e. g., toluene, xylene, dioxane, ethers (e. g., dibutyl ether), esters (e. g., butyl acetate), chlorobenzene, ethylene dichloride, ketones (e. g., methyl ethyl ketone), tertiary alcohols, for instance tertiary-butyl alcohol, tertiary-amyl alcohol, tertiary-hexyl alcohol, etc., as well as others. When the reaction is effected in solution state, then a temperature at or approaching the boiling temperature of the solution generally is used.

The polymerization also can be effected by conventional bulk polymerization technique, in the presence or absence of a solvent capable of dissolving the monomeric mixture and in which the latter preferably is inert; or in solution in a solvent in which the monomeric mixture is soluble but the copolymer is insoluble; or by conventional bead polymerization methods. The polymerization of the mixture of monomers can be effected by a continuous process as well as by a batch operation.

The temperature of polymerization of the polymerizable composition, at atmospheric or slightly above atmospheric pressure and in the presence or absence of a polymerization catalyst, can be varied over a wide range, up to and including or slightly above the boiling point (at atmospheric pressure) of the monomer or monomeric mixture (or of the lowest boiling component thereof), but in all cases is below the decomposition temperature of the monomeric materials. In most cases the polymerization temperature will be within the range of 15° C. to 150° C., more particularly within the range of 20° C. or 30° C. (ordinary room temperature) to 130° C., depending upon the particular mixture of monomers employed, the particular catalyst, if any, used, the rapidity of polymerization wanted, and other influencing factors. With certain catalysts, more particularly strong acidic polymerization catalysts such, for instance, as gaseous boron trifluoride-ethyl ether complex, concentrated sulfuric acid, anhydrous aluminum chloride, etc., a substantially lower polymerization temperature often advantageously may be used, e. g., temperatures ranging between —80° C. and 0° C. or 10° C. At the lower temperatures below the solidification point of the monomeric mixture (or components thereof), polymerization is effected while the mixture of monomers is dissolved or dispersed in a solvent or dispersion medium which is liquid at the temperature of polymerization. Or, if desired, the polymerizable composition can be polymerized in dissolved or dispersed state at temperatures above its solidification point or above the solidification point of the polymerizable components thereof. The polymerization product can be separated from the liquid medium in which polymerization was effected by any suitable means, e. g., by filtration, centrifuging, solvent extraction, etc.

The proportions of unsaturated polyester, examples of which have been given hereinbefore, and acrylonitrile which is copolymerized therewith in the production of my new copolymer compositions, can be widely varied, as desired or as conditions may require in order to produce a copolymer having properties especially suitable for a particular service application. For instance, the proportions can vary within the range of, by weight, from 1% (about 1%) to 90 or 95% (about 90 or 95%), or even as high as 99 or 99.5% (about 99 or 99.5%), of the unsaturated polyester to form 99% (about 99%) to 5 or 10% (about 5 or 10%), or even as low as 0.5 or 1% (about 0.5 or 1%), of acrylonitrile. Generally, for the usual applications, the unsaturated polyester constitutes, by weight, from 1% to 50–75% of the copolymerizable ingredients, and the acrylonitrile constitutes the remainder. In cases where the unsaturated polyester is employed primarily for the purpose of imparting improved dye receptivity to the polymerization product, as for instance in the production of compositions comprising a copolymer of copolymerizable ingredients including acrylonitrile and the unsaturated polyester, the latter, e. g., a diester of an alpha,beta-ethylenically unsaturated dicarboxylic acid with an amino alcohol in which the amino nitrogen is tertiary, specifically bis(2-diethylaminoethyl)fumarate, maleate, itaconate, citraconate and mesaconate, and bis or tris(2-diethylaminoethyl)aconitate, constitutes from about 1% to about 20% (preferably from 1% to about 10 or 15%) of the total weight of the copolymerizable ingredients, and acrylonitrile constitutes the remainder. In other words, for such applications no particular advantages appear to accrue from the use of more of the unsaturated polyester than is required in order to attain the desired improvement in the dye receptivity of the acrylonitrile polymerization product.

In order that those skilled in the art may better understand how the aforementioned polymers and copolymers may be produced, the following examples are given by way of illustration and not by way of limitation. All parts are by weight.

*Example 3*

A portion of the residue of Example 1, prior to distilling off the last of the fraction containing the monomeric bis(2-diethylaminoethly)fumarate, was heated for an additional 2 hours at 200° C. after adding thereto about 5% by weight thereof of a polymerization catalyst, specifically di-tert.-butyl peroxide. A viscous, dark, water-insoluble composition comprising homopolymeric bis(2-diethylaminoethyl)fumarate resulted.

*Example 4*

| | Parts |
|---|---|
| Acrylonitrile | 95 |
| Bis-(2-diethylaminoethyl)fumarate | 5 |
| Benzoyl peroxide | 1 | were heated together in a sealed tube for 120 hours at 60° C., yielding a tan-colored solid comprising a copolymer of acrylonitrile and bis(2-diethylaminoethyl)fumarate.

*Example 5*

A copolymer was prepared by reacting acrylonitrile and bis(2-diethylaminoethyl)fumarate in an aqueous solution. The following ingredients were used:

| | Parts |
|---|---|
| Acrylonitrile containing 3.1% water | 49.3 |
| Bis(2-diethylaminoethyl)fumarate | 5.3 |
| Distilled water | 900.0 |
| Sulfuric acid ($H_2SO_4$) | 1.5 |
| Ammonium persulfate, $(NH_4)_2S_2O_8$, in 50 parts of water | 1.71 |
| Sodium metabisulfite, $Na_2S_2O_5$, in 50 parts of water | 0.71 |

The reaction was carried out for 4 hours at 35° C., with stirring, under an atmosphere of nitrogen. The yield of white, granular, solid copolymer amounted to 29 parts.

Example 6

Samples of the acrylonitrile copolymer of Example 5 and of homopolymeric acrylonitrile that had been prepared in the same manner were subjected to the following dye test:

Dye baths consisting of 500 parts of an aqueous solution containing 0.2 part of concentrated sulfuric acid, 1 part of sodium sulfate and 0.2 part of Calcocid Alizarine Blue SAPG (Color Index No. 1054) were prepared. To one bath was added 10 parts of the acrylonitrile copolymer of Example 5 while to the other was added the similarly prepared homopolymeric acrylonitrile. Both baths were boiled for 30 minutes, after which the polymerization products were filtered off and thoroughly washed with hot water. The acrylonitrile copolymer was dyed purple and its dye bath was nearly exhausted, while the sample of homopolymeric acrylonitrile was undyed and the dye bath in which it had been immersed was unchanged. The advantage of modifying an acrylonitrile polymerization product by replacing a part (e. g., from about 1% to about 15 or 20% or more, still more particularly from 1 or 2% to 5 or 10%, by weight) of the initial acrylonitrile with an unsaturated polyester of the kind used in practicing the present invention, thereby to obtain a copolymeric acrylonitrile substance of improved dyeabiltiy, is therefore quite apparent.

Example 7

A reaction vessel, equipped with a stirrer, reflux condenser, thermometer and gas-inlet tube, was placed in a constant-temperature bath which was maintained at 25° C. To the vessel was added a solution of 50.3 parts of acrylonitrile (dry), 2.65 parts of bis(2-diethylaminoethyl)fumarate, 900 parts of distilled water and 0.83 part of sulfuric acid. The pH of this solution was 3.1. A rapid stream of pre-purified nitrogen was passed over the surface of the solution for 30 minutes. The nitrogen flow was then decreased to one bubble per second. To the vessel was then added 1.71 parts of ammonium persulfate and 0.71 part of sodium metabisulfite, each dissolved in 50 parts of water. The polymerization was carried out for 5 hours at 25° C. while continuing the stirring under nitrogen. The copolymer of acrylonitrile and bis(2-diethylaminoethyl)fumarate was collected on a Büchner funnel, washed with deionized water and dried in a 70° C. oven. The yield of dry copolymer amounted to 41 parts. The specific viscosity of a 1% solution of this copolymer in dimethyl formamide at 25° C. was 2.77. Its heat stability was comparatively good. It showed a loss in refluctance at 450 millimicrons (wave length) of 52% after being heated in an oven for 2 hours at 150° C., as compared with about 75–80% loss in reflectance at the same wave length for a similarly prepared copolymer of acrylonitrile and monoallyl amine when tested in the same manner for heat stability.

Example 8

A higher-molecular-weight copolymer was produced by following exactly the same procedure and formulation described under Example 7 with the exception that 0.36 part of sodium metabisulfite was used and the temperature of the reaction mass was maintained at 35° C. The yield of copolymer amounted to 40.5 parts. The specific viscosity of a 1% solution of the copolymer in dimethyl formamide at 25° C. was 8.4.

It will be understood, of course, by those skilled in the art that my invention is not limited to the specific ingredients named in the above illustrative examples nor to the particular proportions and methods of ester preparation and of polymerization and copolymerization given therein.

The polymerizable compositions of my invention can be used in the production of castings of any desired shape or size; as adhesives; in the treatment of paper or paper stock; in coating compositions; and for various other purposes. The copolymer can be formed in situ after application of the mixture of copolymerizable substance to the base material to be coated, impregnated or otherwise treated.

The new materials (polymerizable compositions and polymerization products) of this invention have numerous other uses, for example uses such as are given in the aforementioned Kropa et al. Patent No. 2,539,438 and Drechsel et al. copending application Serial No. 121,066, filed October 12, 1949, now Patent No. 2,550,652, dated April 24, 1951.

Fibers can be produced from certain of the copolymers of this invention, for example acrylonitrile copolymers containing up to about 15 or 20% by weight of combined unsaturated polyester of the kind with which this invention is concerned. Such fibers can be produced in the manner described in, for example, the copending application of Arthur Cresswell, Serial No. 76,668, filed February 15, 1949, now Patent No. 2,644,803 dated July 7, 1953, with particular reference to the production of a molecularly oriented fiber from a copolymer of acrylonitrile and allyl alcohol. The unoriented and oriented fibers produced from the unsaturated polyester copolymers of this invention are readily dyed, especially with an acid dye, while the fiber is in either a gell (e. g., aquagel) or a dry state.

I claim:

A composition comprising a copolymer of copolymerizable ingredients including, by weight, (1) acrylonitrile and (2) bis(2-diethylaminoethyl)fumarate, the compound of (2) constituting from about 1% to about 20% of the total amount of (1) and (2).

References Cited in the file of this patent

UNITED STATES PATENTS

| | | |
|---|---|---|
| 2,047,398 | Voss et al. | July 14, 1936 |
| 2,246,264 | Pinkernelle | June 17, 1941 |
| 2,255,313 | Ellis | Sept. 9, 1941 |
| 2,279,882 | D'Alelio | Apr. 14, 1942 |
| 2,439,074 | Caldwell | Apr. 6, 1948 |
| 2,601,251 | Bruson | June 24, 1952 |

OTHER REFERENCES

Fusco et al.: Gazzetta Chimica Italiana 79, pp. 129–139 (1949).